Nov. 13, 1934.  T. P. MUSGRAVE  1,980,497
SYSTEM OF SEATING
Filed May 11, 1933   8 Sheets-Sheet 1

INVENTOR
THOMAS P. MUSGRAVE.
BY Ely & Pattison
ATTORNEYS

Nov. 13, 1934.　　　T. P. MUSGRAVE　　　1,980,497
SYSTEM OF SEATING
Filed May 11, 1933　　8 Sheets-Sheet 2

INVENTOR
THOMAS P. MUSGRAVE.
BY
Ely & Pattison
ATTORNEYS

WITNESS:

Nov. 13, 1934.   T. P. MUSGRAVE   1,980,497
SYSTEM OF SEATING
Filed May 11, 1933    8 Sheets-Sheet 4

INVENTOR
THOMAS P. MUSGRAVE.
BY Ely & Pattison
ATTORNEYS

Nov. 13, 1934.  T. P. MUSGRAVE  1,980,497
SYSTEM OF SEATING
Filed May 11, 1933   8 Sheets-Sheet 7

INVENTOR
THOMAS P. MUSGRAVE
BY Ely + Pattison
ATTORNEYS

Patented Nov. 13, 1934

1,980,497

UNITED STATES PATENT OFFICE 1,980,497

SYSTEM OF SEATING

Thomas P. Musgrave, East Orange, N. J.

Application May 11, 1933, Serial No. 670,577

19 Claims. (Cl. 155—33)

This invention relates to improvements in theater seats and more particularly to a system of seating the patrons of motion picture theaters.

The main object of the invention resides in a system of seating for moving picture theaters and like auditoriums for facilitating easy ingress to, and egress from a seat, and in eliminating annoyance to other patrons when entering or leaving a seat.

Some of the many objects of the invention are, to provide a seating system which permits of an unobstructive passage through a row of seats to and from the seat to be occupied, and eliminates the necessity of passing a patron in that particular row of seats; to provide a one way entrance aisle, and a one way exit aisle to avoid annoyance and confusion caused by persons walking in opposite directions when entering and leaving the interior of the theater; and to diminish the annoyance to seated patrons caused by other patrons obstructing their view by entering or leaving a forward row of seats.

Another feature of the invention resides in a systematic seating arrangement which will eliminate the present annoyance to patrons and ushers of having vacant seats scattered about the theater, as the system requires that the first patron or group of patrons entering a row must select a seat or seats next to the exit aisle and that each succeeding patron entering that same row must occupy the seat next to the last occupied seat. Thus the patrons of any particular row, being consecutively seated in the sequence with which they entered that row, will desire to and be enabled to leave their seats with the same sequence and without annoying other patrons of that row.

A further object of the invention is the provision of a theater seating system wherein the end seat of a row adjacent the exit aisle is automatically lowered and transferred to a position adjacent the entrance aisle where it raises into position within the row, and forms the end seat adjacent the entrance aisle, the other seats and their occupants of the row all moving simultaneously toward the exit aisle at a speed unnoticeable to the occupants of the occupied seats of that row or to the patrons in other rows, whereby the occupants of the seats of a row are moved toward the exit aisle in accordance with the order in which they entered the theater.

With these and other objects in view, the invention resides in the particular combination and arrangement of parts, the essential features of which are hereinafter fully described in the specification, and pointed out in the appended claims and are illustrated in the accompanying drawings, in which:

Referring to the drawings by reference characters, the letter A designates a sample seating plan of a theater or like auditorium which includes an entrance aisle B, and an exit aisle C, and between which aisles, there are rows of seats D. Each row of seats embodies any predetermined number of identical folding chairs 10, and normally the chair nearest the exit aisle is in an open position while the others are locked in closed position whereupon a patron of the theater first to enter a vacant row of seats from the entrance aisle B must seat himself in the said open chair which, as will be hereinafter explained releases the next adjacent chair only, for occupancy for the next patron entering that particular row, thus the row fills from the exit toward the entrance aisles. The end chair adjacent the exit aisle, being the first chair of that row to be vacated, disappears when vacated and returns to the opposite end of the row, and the other chairs of the row are at the same time moved over toward the exit aisle to position the occupants thereof nearer the exit aisle. The construction and operation of the parts for carrying out this system will now be explained, but it might be stated at this point, that the seated occupants of a theater running continuous moving picture performances or vaudeville will be moved to positions adjacent the exit aisles in the order in which they have entered any particular row of seats, and who may leave a row of seats in the order in which they entered the row without disturbing the other patrons of the theater after having viewed a complete performance.

Although I have illustrated the chairs in straight rows, it will be understood that they may be arranged in curved rows if desired, without departing from the spirit of my invention.

Figure 3:
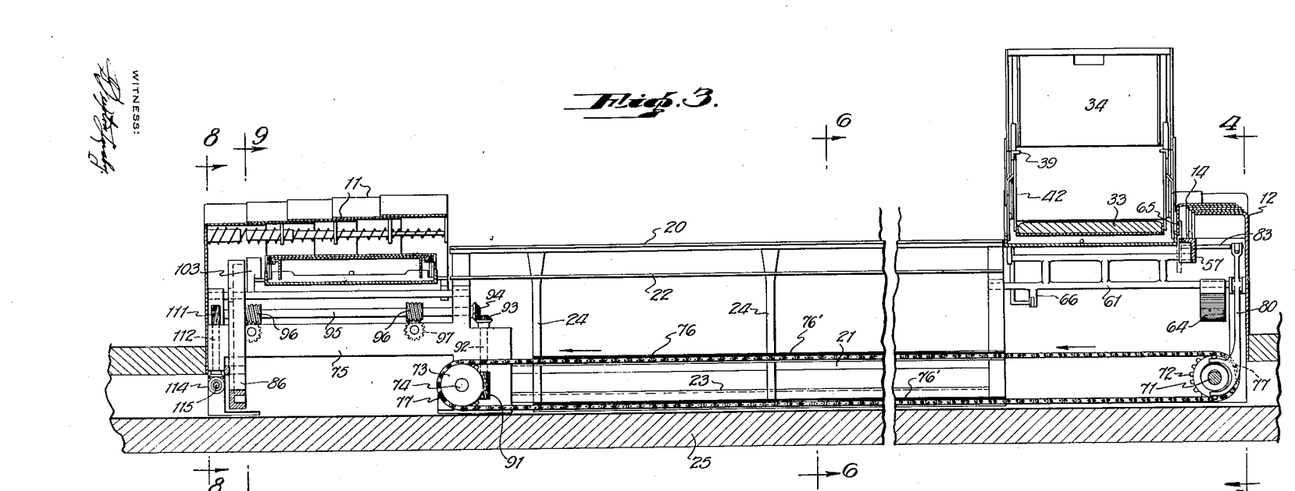
Figure 3 is a vertical fragmentary longitudinal sectional view through a row of seats illustrating the parts in working position and just prior to the completion of a complete cycle of operation.
Figures 5, 16:
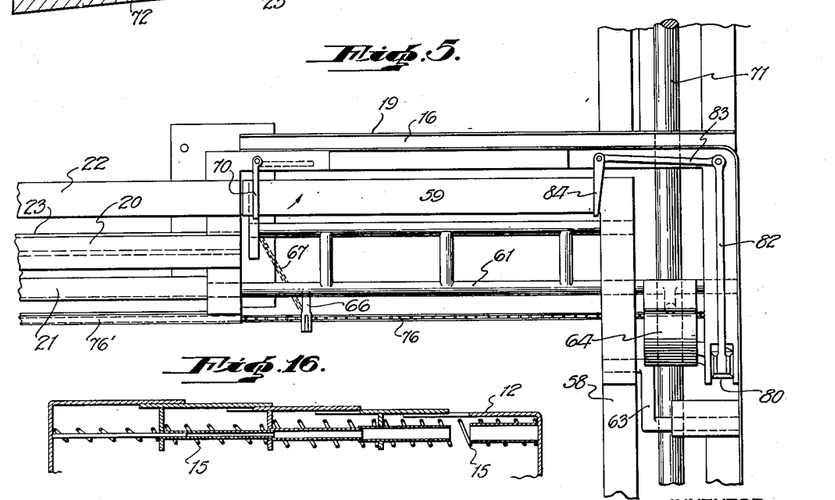
Figure 5 is a top plan view of the chair lowering mechanism.
Figure 16 is a detail vertical sectional view through one of the telescoping end housings showing the telescoping sections in extended position.

In view of the fact that each row of seats D are of identical construction, a description of one row will suffice for the others. Arranged at opposite ends of each row, are collapsible housings 11 and 12 which are open at their inner sides. The housing 11 is arranged adjacent the entrance aisle B and the housing 12 adjacent the exit aisle C, and both being of identical construction, a description of one is sufficient to describe the other. Each telescoping housing includes a stationary end section 13, and slidable lapping telescoping sections 14, normally held in an extended position by spring means 15, Figure 16, so that pressure against the innermost telescoping section will cause the sections to telescope the stationary section 13 as shown at the right of Figure 3 of the drawings. The telescoping sections 14 are slidable in grooves 16 provided in elevated flooring 17, and in upstanding frames 18 and 19 associated with the respective housings 11 and 12 for closing the rear sides thereof.

Figure 6:
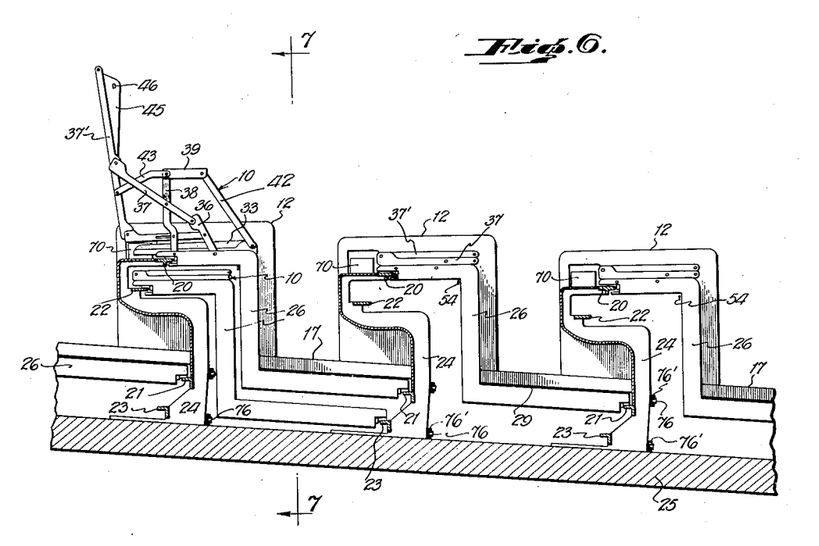
Figure 6 is a vertical transverse sectional view on the line 6—6 of Figure 3 and taken through three rows of seats.
Figure 7:
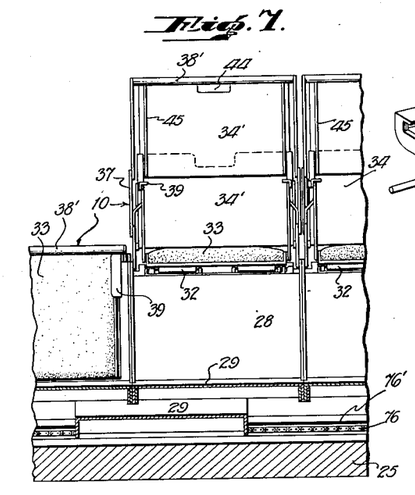
Figure 7 is a fragmentary vertical sectional view on the line 7—7 of Figure 6.
Figure 8:
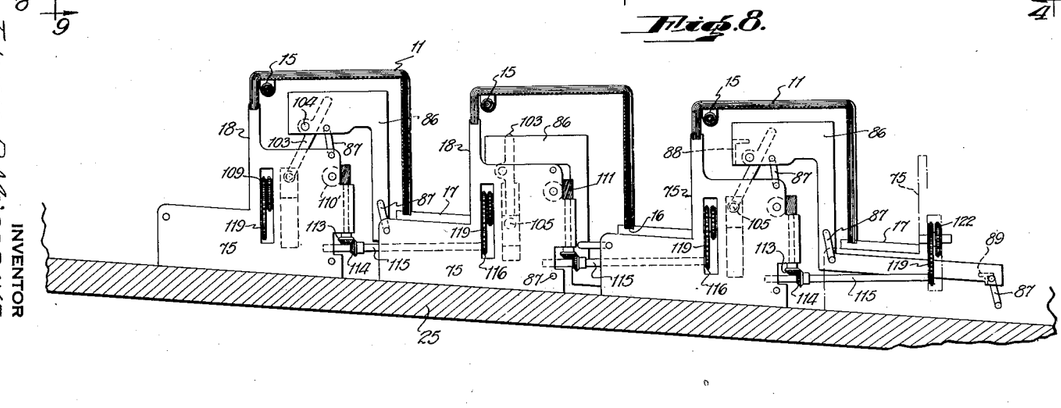
Figure 8 is a vertical transverse sectional view on the line 8—8 of Figure 3, and taken through three rows of seats and illustrating the chair raising mechanism in raised position in certain rows and in lowered position in another row.
Figure 9:
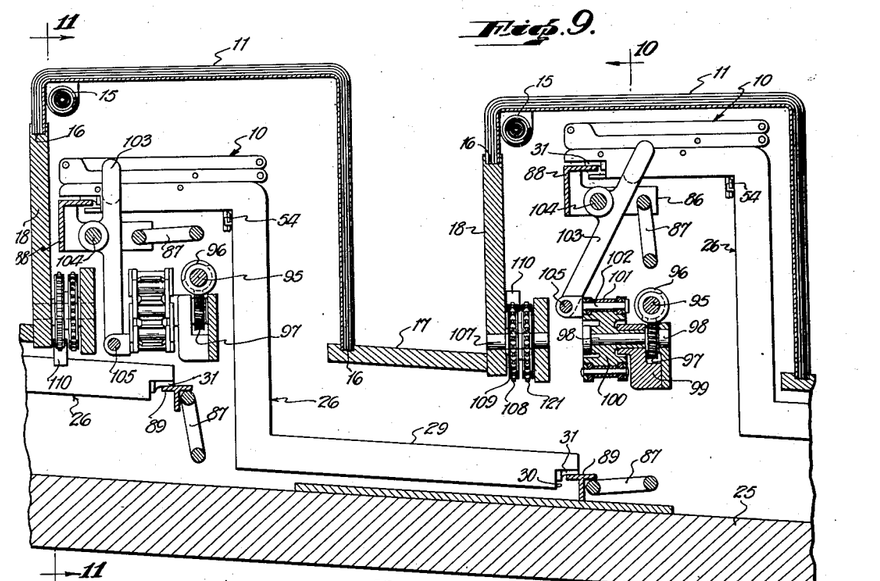
Figure 9 is a vertical transverse sectional view on the line 9—9 of Figure 3.

Extending between the housings 11 and 12 are a set of parallel upper rails 20 and 21, and a set of parallel lower rails 22 and 23. These rails terminate at the open side of the housings 11 and 12 when the housings are in extended position, and the rails 20 and 22 are supported upon brackets 24 of the particular row, whereas the rails 21 and 23 are supported upon the brackets 24 of the forward row as best seen in Figure 6. The brackets 24 are secured to and rise upwardly from lower flooring 25. The flooring is inclined as is the custom in theater floor construction to gradually raise the level of the rows of seats from front to rear.

The folding chairs 10 above mentioned move over the upper set of rails 20 and 21 in the direction of the exit aisle, and the end seat adjacent the exit aisle after being vacated by an occupant and folded, is returned to the opposite end of the row. To accomplish this, I construct a novel form of folding chair and a description of one will suffice for the others. Each chair 10 includes a lower Z-shape frame section 26, the top horizontal portion of which supports a plate 27, the vertical portion provides a riser 28, whereas the lower horizontal portion provides a foot rest 29. The plate 27 and riser 28 are set inwardly of the edges of the sides of the frame to facilitate compact folding of the sides and back section of the chair now to be explained.

The opposite ends of the Z-shaped frame 26 are undercut as at 30 to receive the rails on which the chair moves, and rollers 31 extend from the frame at opposite ends and which ride over the rails to reduce the friction between the chair and rails.

Figures 18, 19, 20, 21, 22, 23:
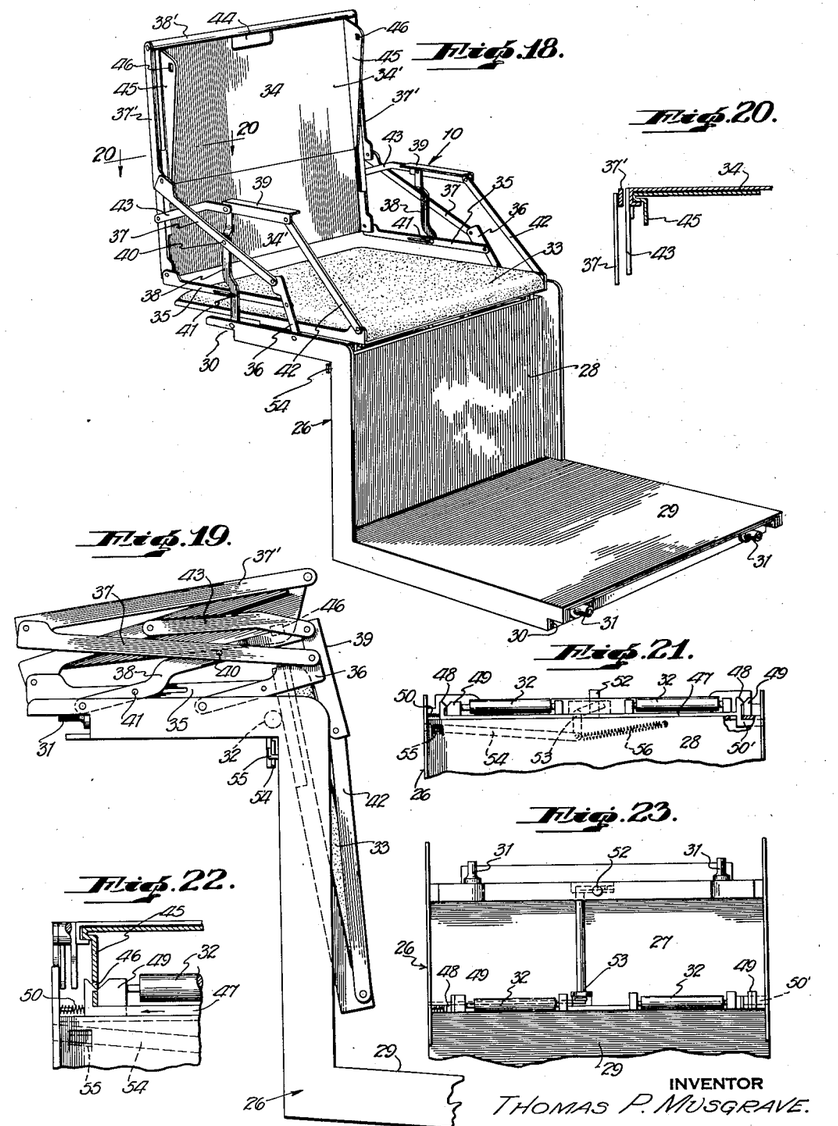
Figure 18 is a perspective view of one of the folding chairs illustrating the same in open position, with only the cushion upholstery shown.
Figure 19 is a side elevational view of a chair in partially folded or collapsed position.
Figure 20 is a detail horizontal sectional view on the line 20—20 of Figure 18.
Figure 21 is a fragmentary front elevational view of the seat support portion of the chair.
Figure 22 is an enlarged detail view illustrating the manner in which the back of the chair is latched when in closed position.
Figure 23 is a fragmentary top plan view of the seat support.

Mounted in bearings at the front of the top plate 27 are rollers 32, which support the front end of a sliding cushioned seat 33. Associated with the seat 33 is a back including two slidably connected lapped sections 34, and to the lower end of which, one end of links 35 are pivotally connected at opposite sides thereof. The links extend forwardly and have their other ends pivoted to arms 36 intermediate the ends thereof, one end of said arms being pivoted to the sides of the Z-shaped frame 26 and the other ends pivoted to the forward ends of brace arms 37, the rear ends of said brace arms being pivoted to the lower ends of links 37', the upper ends of the links turnably supporting the rod 38' which supports the upper section 34'. Prop arms 38 have their lower ends pivoted to the top of the Z-shaped frame adjacent the rear thereof while their opposite ends are pivotally connected to the rear ends of arm rest members 39, the said prop arms crossing the links 35 and brace links 37. The brace links 37 are pivoted to the respective prop arms as at 40, while pin and slot connections 41 connect the prop arms with the links 35. Brace links 42 are pivoted to the front ends of the seat 33 and to the forward ends of the arm rest members, while brace links 43 pivotally connect the rear end of the arm rest members with the lower back section 34'. When the chair is in open position as shown in Figure 18 of the drawings, the back 34 rises upwardly and the arm rest members 39 are elevated by the arms and links connected thereto, while the rear end of the seat 33 projects beyond the plane of the rear of top portion of the Z-shaped frame 26. However, upon grasping the rod 38' through the opening 44 provided in the top of the back section and swinging the same forwardly, the seat 33 will slide forwardly of its support and drop with the brace links 42 and arm rest members 39 to vertical position against the riser 28 and be nested within the confines of the opposite sides of the Z-shaped frame. During the folding of the chair, the other arms and braces fold against each other as illustrated in Figure 6. The upper back section 34' is provided with forwardly extending flanges 45 adjacent opposite sides thereof and which are provided with latch keeper openings 46. A sliding latch bolt 47 is mounted upon the front edge of the top plate 27 and has beveled face hook portions 48 on opposite ends thereof, the said hook portions being urged against coacting beveled lugs 49 rising from the plate 27 by a spring 50. When the chair is folded, the flanges 45 of the back section ride down the beveled faces of the lugs 49 forcing the hook portions 48 of the latch bolt away from the lugs, after which they enter the openings 46 and secure the chair in folded or closed position.

Each chair when folded is locked against opening as shown in Figure 22, and which is unlocked only by a predetermined weight bearing on the cushion of the next adjacent open chair. For the release of the flanges 45 the latch bar 47 is provided with an angular extension 50' on one end thereof which extends beneath the plate 27 to one side of the frame 26.

Each chair is also provided with a latch bolt actuating means for operating the latch bolt of the next adjacent chair when the said chair bears the above predetermined weight. This actuating means includes a vertically slidable pin 52 rising from the rear of the top plate 27 and on which the cushion seat 33 rests. This pin is in the path of movement of one arm of a bell crank lever 53, the other arm of the said lever being pivotally connected to the inner end of a bolt actuating member 54 which is disposed adjacent the inside of the riser 28 and normally projects to the edge of the frame 26 at a point directly opposite the angular extension 50'. The free end of the member is slidably supported by a bracket 55 struck from the riser 28. The above predetermined weight bearing upon the seat 33 will cause the pin 52 to actuate the bell crank 53 causing the free end of the actuating member to be extended and push against the angular extension 50' of the next adjacent chair, which slides the latch bolt 47 thereof, thus permitting the back section 34 of the chair to be swung upwardly to open the said chair. A spring 56 acts upon the latch actuating mechanism to return the same to normal position when the predetermined weight is lifted from the cushion of the open chair.

From the description of the folding chair 10, it will be seen that the same may be folded into a compact structure which is the normal position, and that the latch mechanism for unlocking a chair is dependent upon this condition, and is operative only while the cushion of the next adjacent chair actually bears a predetermined weight. Although the seat portion is shown as provided with a cushion it will be understood that other parts may be suitably upholstered and the various levers protected against contact by a person seated in the chair. By this construction, a person entering a row of seats must take a seat next to one already occupied.

Figure 4:
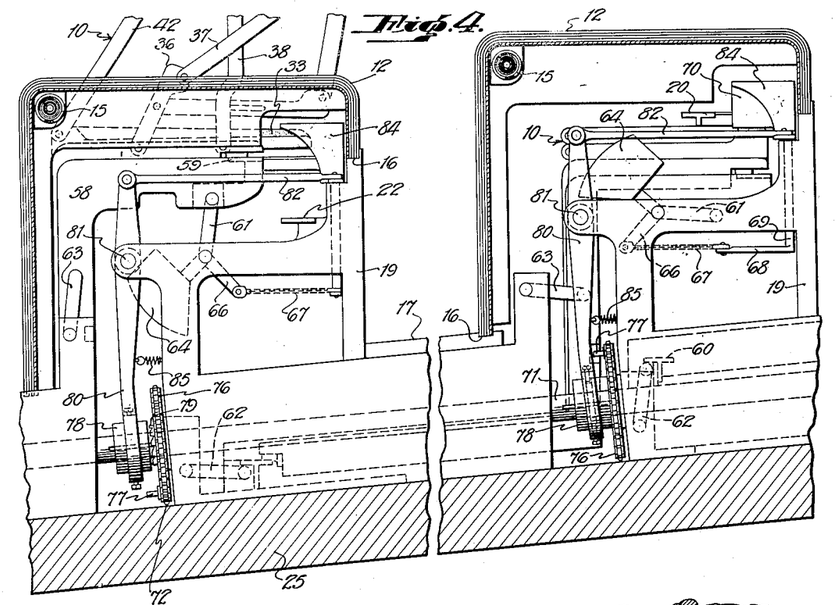
Figure 4 is a vertical transverse sectional view on the line 4—4 of Figure 3, but taken through two rows, the chair lowering mechanism being shown in a raised position in one row and in a lowered position in the other row.
Figure 15:
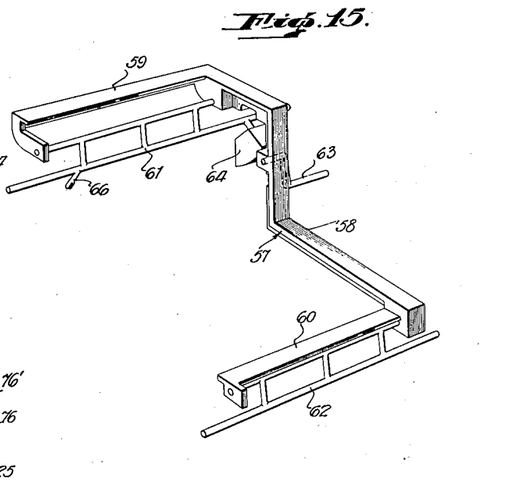
Figure 15 is a perspective view of the lowering elevator per se.
Figure 17:
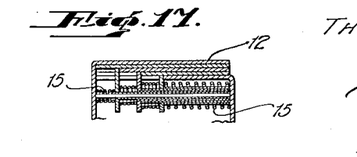
Figure 17 is a view similar to Figure 16 but showing the telescoping sections in collapsed position.

For the purpose of lowering the folded chair 10 from the position on a plane with the upper set of rails 20 and 21 to the plane of the lower set of rails 22 and 23, I provide an elevator device or chair cradle 57 adjacent the exit end of the row and which is shown in perspective in Figure 15 of the drawings. The device includes a Z-shaped outer side frame 58 from which rails 59 and 60 extend, and which rails respectively align with the rails 20 and 21, when the elevator is in a raised position, and with the lower set of rails 22 and 23 when in a lowered position. The upper and lower ends of the frame 58 are pivotally supported upon ladder shaped frames 61 and 62, which in turn have their bearings in the frame 19 of one row and the frame 19 of the adjacent forward row as best seen in Figure 4 of the drawings. A crank support 63 extends from the frame 58 intermediate its ends and also has its bearing in the frame 19. By pivoting the cradle or elevator at the three points mentioned, the same permits a range of swinging movement sufficient to bring the rails 59 and 60 in alignment with either the upper or lower sets of track rails. The elevator is balanced by a counter-weight 64 mounted on an arm extending from the pivot frame 61. The elevator 57 is normally in a raised position and is held in this position only by an open chair (by means later described) so as to support the seat next to the exit aisle. Before a chair rides onto the rails of the elevator, the telescoping housing 12 is in extended position but is pushed by the movement of an opened or closed chair to a folded or collapsed position by reason of the outer side of a chair striking the depending flange 65 on the innermost telescoping section 14. The housing 12 combined with chair adjacent the exit aisle encloses the mechanism at the exit end of a row of chairs at all times.

The counter-balance weight 64 serves only to bring the elevator to a raised position to receive a chair from the upper set of rails 20 and 21, so that a folded chair, for which the elevator is not held in a raised position, riding onto the same will overbalance the counterweight and cause the elevator to swing to lowered position. For locking or holding the elevator in a raised position when an open chair is slid thereon, there is provided an arm 66 extending from the pivot frame 61 to which one end of a chain 67 is connected, the other end of the chain being connected to a horizontally disposed arm 68 carried by the lower end of a vertical shaft 69 which has its bearing in the frame 19. An actuating wing 70 is fixed to the top of the shaft 69 in the path of the rear end of the seat 33 when the chair is in an open position, and which is given a quarter turn to elevator locking position as shown in dotted lines in Figure 5, so as to turn the shaft 69 and arm 68 to exert a pull upon the chain 67 to take up any slack therein and prevent upward movement of the counter-weight 64, thus the chair so long as it remains open is supported in an elevated position upon the elevator 57. It will be appreciated that the rollers 31 of the chairs 10 are positioned far enough in from the ends of the frame 26 to allow the seat to contact the arm 70 and move the same to the dotted position shown in Figure 5, even before the forward roller 31 leaves the rails 20 and 21. Should a folded chair slide onto the elevator, the rear end of the chair being out of the path of the wing member will pass the same, thus the combined weight of the chair and elevator will overbalance the counter-weight 64, causing the elevator with the folded chair to swing to a slightly lowered position as soon as the four rollers have cleared the rails 20 and 21. The relation between the force exerted by the counterweight 64 to the counteracting gravitational force of the elevator 57 is fixed so that the entire weight of the folded chair must rest on and combine with the weight of the elevator 57 in order to overbalance the counterweight 64 and allow the chair and elevator to assume this slightly lowered position. The elevator 57 combined with only the partial weight of a chair, when only partially on the elevator, will not be sufficient to overbalance the counterweight 64 and will not allow the elevator and chair to move from its full upper position. Thus it is required that all four rollers of the chair must rest upon the rails 59 and 60 of the elevator 57 before the elevator and its supported chair will leave its full upper position and assume the slightly lowered position. In this slightly lowered position, the end chair is still abutting the next adjacent chair and being moved by it. In this position, the entrance aisle side of the folded chair is supported at two points by the ends of the rails 20 and 21. The folded chair is now held firmly by the elevator 57 in the same horizontal plane with itself. Thus it follows that the folded chair and the elevator combined are supported by the ends of the rails 20 and 21. When the folded chair 10 has been moved completely clear of the rails 20 and 21, the elevator 57 with the folded chair is lowered to its full lowered position. Tolerances or clearances between the folded chair and the elevator rails 59 and 60 are such as to hold the chair firmly horizontal and thus prevent jamming before the chair is completely clear of the rails 20 and 21. To lessen any tendency to jam at this point, the counterbalance weight 64 is exerting an upward force on the elevator 57 and thus serve to minimize the downward force of the combined weight of the elevator 57 and the folded chair. Also, when an open chair is completely clear of the rails 20 and 21 and supported by the elevator, and the same is folded, the seat of the chair moves from engagement with the wing member 70 releasing the tension of the chain and permits the weight of the chair and the elevator to overbalance the counter-weight and automatically move to a full lowered position.

Extending through the housing at the exit end of the rows of seats and common to all the rows of a seat section, is a driven shaft 71 on which a sprocket 72 is turnably mounted for each row of seats, the shaft being on a plane between the floors 17 and 25 as shown in Figure 3. A sprocket 73 is mounted on a shaft 74 arranged adjacent the plane of the inner open end of the housing 11, and which shaft is journaled in a frame 75. Passing over sprockets 72 and 73 is an endless sprocket chain 76 having two pins 77 extending outwardly therefrom and movable in a path with the chain to engage one side of a folded lowered chair for sliding the same off the lowered elevator onto the lower rails 22 and 23 and therealong to the opposite end of the row. The two leads of the chain 76 are supported against sagging by guides 76' supported by the brackets 24. The pins 77 are equidistantly spaced along the length of the chain. The sprockets, chain and pins are positioned, so as to engage and move a folded chair in one direction only, namely from a position adjacent the exit aisle to a position adjacent the entrance aisle.

For starting and stopping the conveyor, consisting of the sprockets and chain, and all other driven mechanisms of the particular row, I provide a mechanism controlled by the final sliding movement of an open seat after it has been initially moved onto the elevator from the upper rails. This mechanism includes a clutch element 78 slidably keyed to the driven shaft 71 adjacent the sprocket wheel 72 and which is movable into and out of clutching engagement with a coacting clutch member 79 provided on the adjacent side of the sprocket wheel 72. A forked lever 80 has its forked end operatively connected to the clutch element 78, and is pivoted to the frame 19 as at 81 at a point intermediate its ends to be movable as a rock lever. A horizontal link 82 has one of its ends pivotally connected to the top of the lever 80 and its other end pivotally connected to one arm of a horizontally disposed bell crank lever 83, the other arm 84 of the said bell crank lever in the form of an upstanding wing being in the path of movement of an open chair as it rides to its extreme position onto the elevator. It will be seen that an open chair will strike the arm 84, causing the rearward movement of the link 82, which pulls upon the yoke lever 80 causing the clutch element 78 to disengage the clutch element 79. When an open end chair is completely folded, and at which instant the folded seat is lowered by the elevator, the rear end of the seat of the previously open chair is moved out of the path of the arm 84 thus permitting the spring 85 to pull the yoke lever in a direction to cause the clutch element 78 to engage the clutch element 79 whereupon the sprocket wheel 72 is driven from shaft 71 causing the upper lead of the sprocket chain to move toward the entrance end of the row or in the direction shown by the arrows in Figure 3. If the clutching elements are engaged and a folded chair rides upon the elevator, it will clear the actuating arm 84, and be lowered in a manner hereinbefore described, but such clutch elements are disengaged immediately upon the extreme limit of movement toward the exit aisle of one open chair upon the elevator. Thus all lateral movement within that particular row of chairs ceases immediately.

After engaging a folded chair and moving the same from one end of the row to the other on the rails 22 and 23 by the operation of the chair conveyor the same delivers the folded chair to an elevator 86 arranged within the housing 11. The elevator 86 is of substantially the same construction as the elevator 57 in that it is substantially Z-shaped in end elevation and is swingingly supported at three points, upon two ladder shaped frames 87 similar to 61 and 62, and a crank support 87 is similar to crank support 63, having their bearings in the frame structure 75. The elevator 86 includes upper and lower rails 88 and 89 adapted to align with the lower set of fixed rails 22 and 23 when the elevator 86 is lowered and with the upper set of fixed rails 20 and 21 when the said elevator is in a raised position.

The raising and lowering of the elevator 86 is controlled by the operation of the chain conveyor and is driven therefrom. Mounted on the shaft 74 rearward of the sprocket 73 is a worm wheel 90 which meshes with a worm gear 91 fixed to a vertical shaft 92 journaled in the frame structure 75. The top of the shaft 92 carries a pinion gear 93 which meshes with a pinion gear 94 carried on the inner end of a horizontally disposed shaft 95, which is also journaled in the frame structure 75. The shaft 95 carries spaced worms 96 which engage worm wheels 97 fixed upon horizontal stub shafts 98 mounted in fixed bearings 99. The stub shafts 98 have sprocket wheels 100 over which a sprocket chain 101 passes. Thus it will be seen that the sprocket wheels are driven indirectly from the driven sprocket shaft 74 when the chain conveyor is in operation.

Figure 10:
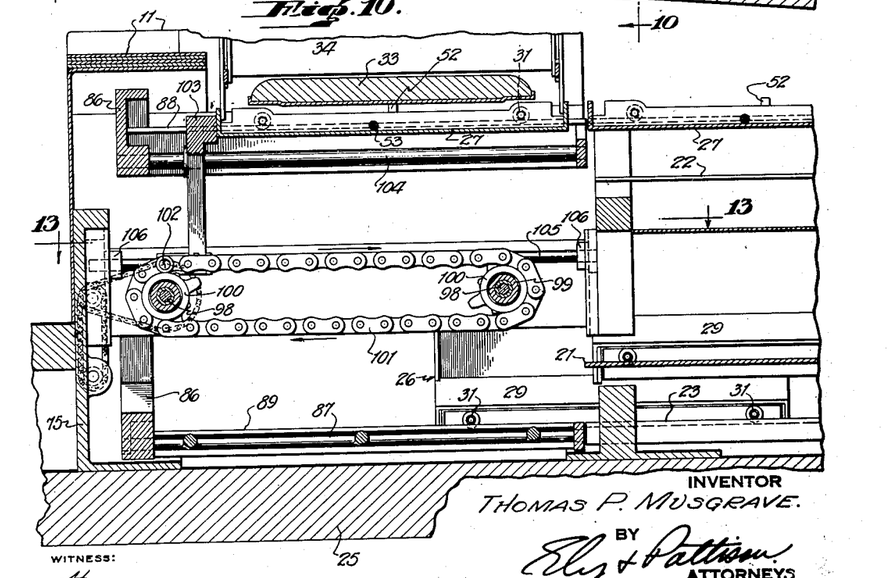
Figure 10 is a detail vertical longitudinal sectional view on the line 10—10 of Figure 9 but showing the raised chair in an open position about to be moved into abutting engagement with the next adjacent chair to move the row of chairs a predetermined distance to cause the exit aisle seat to engage the power control member to shut off the operation of the power.

Pivoted to the wrist pin 102 mounted in one of the links of the chain 101 is the lower end of a combined elevator actuating arm and chair slider member 103 which is slidably mounted upon a rail 104 fixed to the elevator 86 and upon a rail 105 supported in vertical slide bearings 106. As the chain 101 moves in the direction of the arrows in Figure 10, the member 103 moves from the plane of the top lead of the chain to the lower lead, and such movement causes the same to pull downwardly upon the elevator 86, while movement of the member from the lower lead of the chain to the upper lead will cause the raising of the elevator. Assuming that a chair has been raised by the elevator 86 as shown in Figure 10 at which time the apparatus is still in operation, it will be seen that the top end of the member 103 strikes the frame of the chair, and inward sliding movement of the same will slide the chair a predetermined distance sufficient to cause the entire row of chairs to move toward the exit aisle, and which movement causes the exit aisle chair to engage the arm 84 to disengage the clutch. This causes the apparatus to stop with the arm 103 and entrance aisle chair in a position slightly further to the right than shown in Figure 10. During the time interval that is required to move an exit aisle chair over to a position to be lifted to an elevated position adjacent the entrance aisle, the arm 103 has moved the prior entrance aisle chair from the elevator onto the upper set of rails 20 and 21 and has moved all the chairs of the row toward the exit aisle, and caused the chair next to the former end chair at the exit aisle, to be moved to a position to take the place of the transposed chair. When the apparatus is at a standstill, all the chairs of a row are on the same plane and available for occupancy. The only time that the above mentioned condition does not exist is during the interval of time that it takes to lower an exit aisle chair and transport it to a position adjacent the entrance aisle and elevate the same to a raised position.

Figure 11:
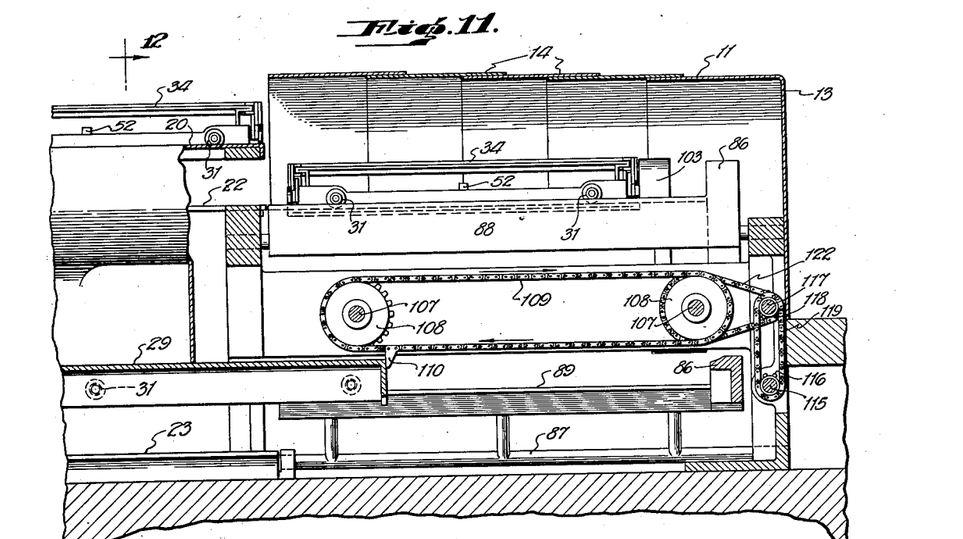
Figure 11 is a detail vertical longitudinal sectional view on the line 11—11 of Figure 9.
Figure 12:
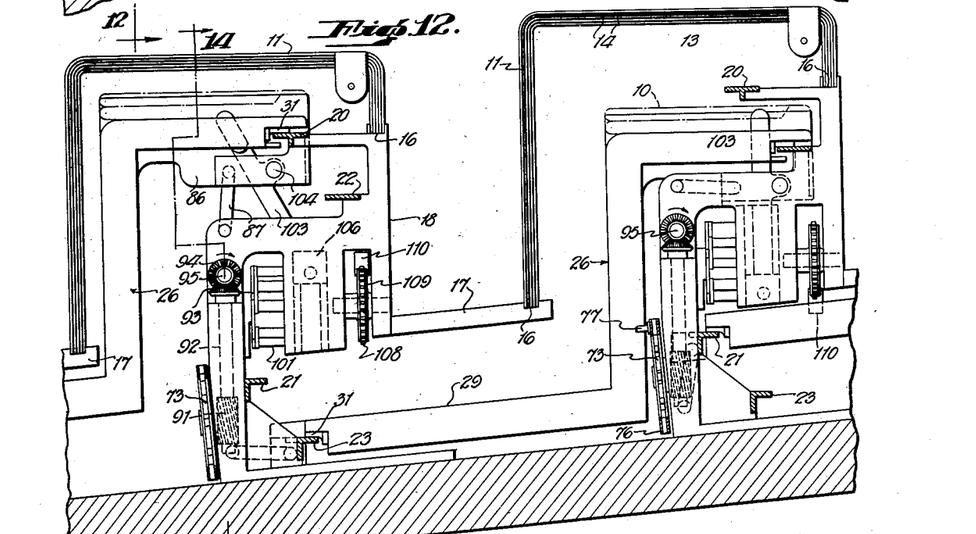
Figure 12 is a vertical transverse sectional view on the line 12—12 of Figure 11.
Figure 13:
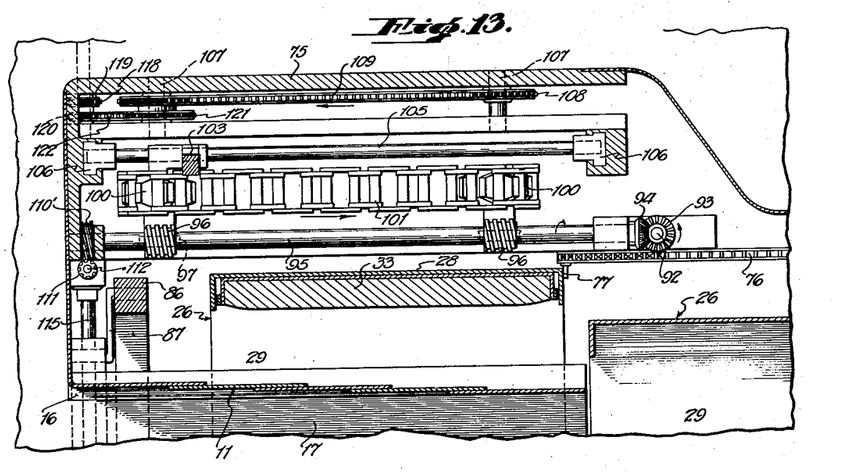
Figure 13 is a horizontal sectional view substantially on the line 13—13 of Figure 10.
Figure 14:
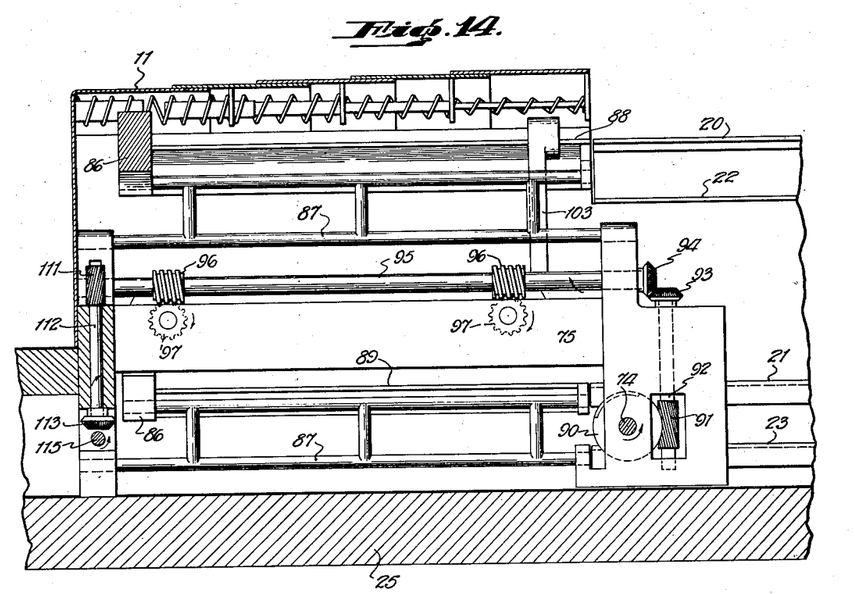
Figure 14 is a vertical sectional view on the line 14—14 of Figure 12.

While the member 103 bears against the seat portion of the chair frame, I also provide a means for simultaneously pushing against the foot portion of the frame to apply even pressure at these two points. However, in view of the fact that the foot portion of a chair of one row extends forwardly beneath the next row, the means for assisting in the pushing of the row of chairs is located in the next forward row but driven by the driven mechanism of the row in which the chairs are being operated. Each of these means includes a pair of spaced stub shafts 107 mounted in fixed bearings and arranged rearwardly of the housing 11. Sprocket wheels 108 are fixed to the shafts over which an endless sprocket chain 109 passes. The chain 109 carries a pushing finger 110 adapted to engage the foot portion of a chair frame when moving in the direction of the arrows in Figure 11 of the drawings. For transmitting power to drive the sprocket chain 109 which is operatively associated with a particular row, I indirectly take the power from the driven shaft 74 of that particular row, and directly from the shaft 95 driven thereby.

Fixed to the outer end of the driven shaft 95 is a worm wheel 110′ meshing with a worm gear 111 carried at the top of a vertical shaft 112 mounted in a fixed bearing on the frame structure 75. The lower end of the shaft 112 carries a pinion gear 113 which has constant mesh with a pinion gear 114 fixed to a horizontal forwardly and rearwardly extending shaft 115 also journaled in fixed bearings in the frame structure. The forward end of the shaft 115 has a small sprocket wheel 116 fixed thereon, while journaled above the shaft 115 on the same plane as the shafts 107, is a stub shaft 117 having a sprocket wheel 118 mounted thereon. A sprocket chain 119 passes over the sprocket wheels 116 and 118 to transmit power to the shaft 117. The shaft 117 carries another sprocket wheel 120 mounted adjacent to sprocket 118. The stub shaft 107 nearest the entrance aisle carries a second sprocket 121. Sprocket chain 122 passes over sprockets 120 and 121, thus the chain 109 is driven in timed relation to the other driven mechanism of a row of chairs. The pusher finger 110 on the chain 109 is so located that it engages the foot end of the raised chair at the same time as the member 103, thus applying forces at two points thereon to slide the row of chairs in the direction of the exit aisle.

Figure 1:
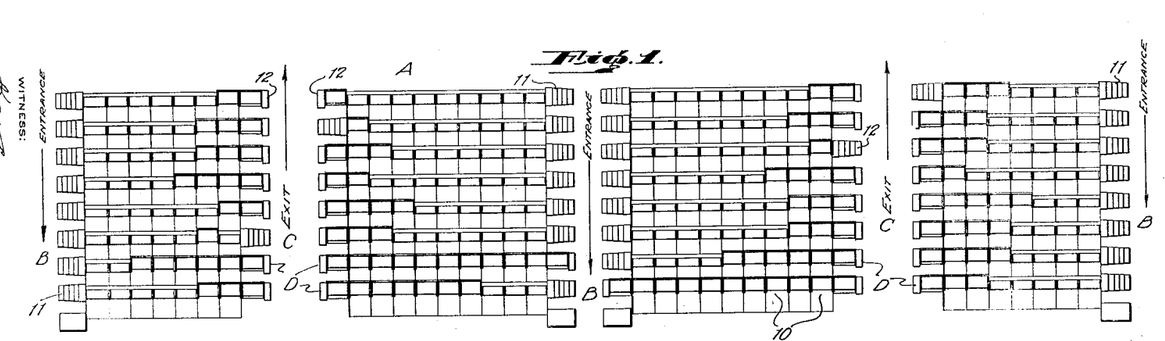
Figure 1 is a fragmentary diagrammatic plan view of one form of a theater seating system arranged in accordance with the invention.
Figure 2:
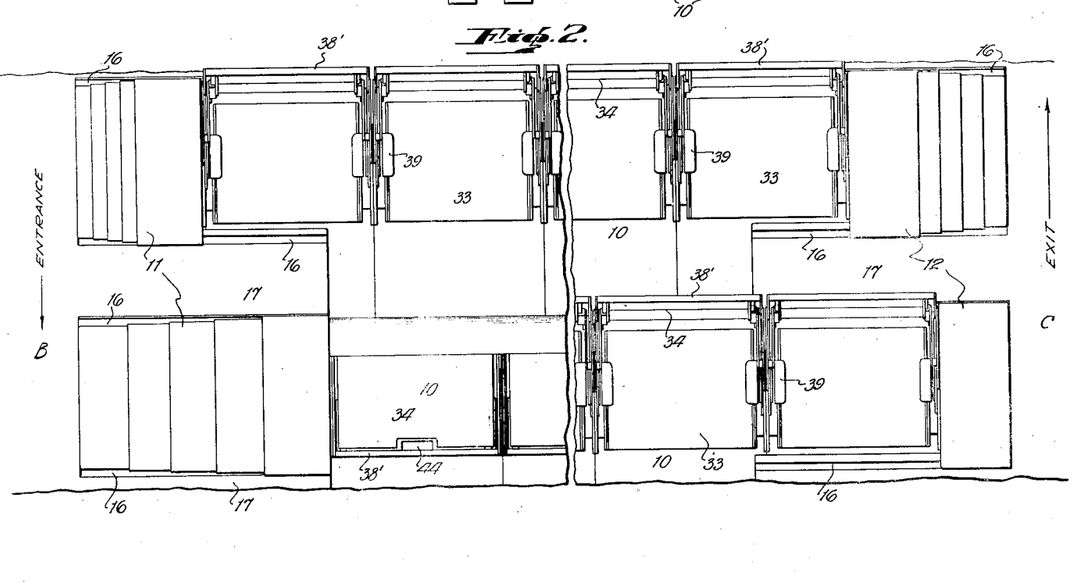
Figure 2 is an enlarged fragmentary top plan view of two rows of seats.

A folded seat lifted by the elevator 86 is housed within the telescoping housing 11 until pushed therefrom by the mechanism just described, but if a row of seats is filled, this chair may be opened for occupancy by an usher or attendant manually collapsing the housing and unfolding the chair to an open position as clearly shown in Figures 2 and 10.

An explanation of one cycle of operation of the invention will now be set forth. Assume that an entire row of chairs are in open position and occupied, including the entrance aisle chair which is supported in an elevated position by the elevator 86. At this time, the chair nearest the exit aisle is supported in an elevated position by the elevator 57 and is in bearing engagement with the arm 84, holding the clutch disengaged so that the operating parts are in stationary position. It should be borne in mind that the arm 103 during a previous operation of the apparatus has shifted the entrance aisle chair a slight distance toward the exit aisle to cause the exit aisle chair to abut the arm 84 to disengage the clutch, which is so held by the exit aisle chair until the said chair has been folded and pressure on the arm 84 released. After the occupant of the exit aisle chair has left the same, the usher folds the exit aisle chair, which folding releases the pressure upon the arm 84 and the wing 70. Release of the arm 84 causes the clutch to engage to transmit power to the conveyor 76 and the other driven parts. The release of the wing 70 releases the tension of the chain 67 which in turn causes the release of the elevator 57 whereupon the weight of the folded chair causes the elevator to rapidly move to lowered position to aline the rollers of the folded chair with the lower set of rails 22 and 23. It should be understood that the speed of the folded chair on the lower rails is much faster than the speed of the chairs on the upper rails. For instance, a chair on the lower rails will be moved approximately half the distance from exit to entrance aisle while all the chairs on the upper rails are moved a distance equal to the width of one chair. During the lowering movement of the elevator, one of the pins 77 on the conveyor chain 76 moves to a position on the upper lead of the chain and picks up the lowered chair and proceeds to rapidly slide the same over the lower rails toward the entrance aisle. As the folded chair clears the elevator 57, the elevator is immediately returned to raised position by the action of the counter balance weight 64, but during the lowering and raising of the elevator, the arm 103 has slowly moved the row of remaining chairs only a short distance toward the exit aisle.

The rollers 31 on the chairs are disposed some distance inwardly of the sides thereof so that although the chair nearest the exit aisle is moving slowly to a position over the lowered elevator 57, the rollers 31 do not pass or clear the ends of the rails 20 and 21 until the elevator 57 returns to raised position. The speed of the conveyor chain 76 and the folded chair it moves to the entrance aisle are in timed relation with respect to elevator 86 and arm 103 so that the arm 103 slowly moves the chair nearest the entrance aisle from the elevator 86 onto the rails 20 and 21, elevator 86 continues its slow movement to lowered position and receives the folded chair at the instant they both reach their extreme positions on the lower level nearest the entrance aisle. By this time, a chair has been slowly moved onto the elevator 57, but not to its extreme position which would cause the chair to engage the arm 84 and disengage the clutch. The apparatus is still in operation, and the arm 103 has dropped from the upper lead of the chain 101 to the lower lead thereof and is returned slowly with elevator 86 to be in a position to engage the returning folded chair after the elevator 86 reaches its raised position. The elevator 86 now being in a lowered position receives the folded chair from the lower set of rails 22 and 23 and moves upward to position the said chair in the same plane as the other chairs of the row. At this point, the arm has moved to the upper lead of the chain 101 with elevator 86, and engages the chair which is now referred to as the entrance aisle chair, whereupon the arm 103 imparts a slight movement thereto sufficient to move all the chairs of the row toward the exit aisle, which causes the open exit aisle chair to abut the arm 84 and disengage the clutch, thus shutting off the operation of the apparatus. It is this initial slight movement of the entrance aisle chair by the arm 103 immediately after the raising of the entrance aisle chair that causes the final sliding movement of the open exit aisle chair into engagement with the arm 84 to stop the operation of the apparatus.

From the foregoing description it will be seen that the chair of a row adjacent the exit aisle may be manually folded by an usher or attendant after the occupant has left the seat and the folded chair will disappear from sight and be transposed to the opposite end of the row where it again enters the row, and during which time the other chairs of the row will be moved in a direction toward the exit aisle. The speed of movement of the chairs toward the exit aisle is such as not to be perceptible by the occupants thereof, nor to persons seated in row therebehind.

While I have shown and described what I deem to be a practical embodiment of my invention, I wish it to be understood that such changes in construction as come within the scope of the appended claims may be resorted to if desired without in any way departing from the spirit of the invention.

Having thus described the invention, what I claim as new and desire to secure by Letters Patent of the United States, is:—

1. In combination, a single row of chairs arranged side by side, means for lowering and transferring the end chair at one end of the row to the opposite end thereof and for subsequently raising the chair back into said row, including means for moving said row of chairs longitudinally during the movement of said end chair from one end of the row to the other.

2. In combination, a row of chairs arranged side by side and movable as a unit longitudinally of the row, means for lowering the end chair at one end of the row out of line with the other chairs of the row, means for transferring the lowered chair to the other end of said row, and means imparting longitudinal movement to said row of chairs a distance equal to the width of the space formerly occupied by the lowered chair.

3. In combination, a row of folding chairs arranged side by side, means operable upon folding of the end chair at one end of the row for moving the same out of the row and transferring said folded chair to the opposite end thereof, and automatic means for simultaneously moving the remaining chairs in the row in the direction toward that end occupied by the folded end chair and for bringing the transferred folded chair back into the row at the opposite end thereof.

4. In a theater or like auditurium having an entrance aisle and an exit aisle, a single row of chairs arranged between said entrance aisle and said exit aisle, means for lowering and transferring the chair next to said exit aisle to the opposite end of said row adjacent said entrance aisle and for subsequently raising the same back into the row, and means for moving said row of chairs toward said exit aisle during the operation of said means to transfer said chair from adjacent the exit aisle to a position adjacent said entrance aisle.

5. In a theater or like auditorium having an entrance aisle and an exist aisle, a row of foldable chairs arranged between said entrance aisle and said exit aisle, the chair next to said exit aisle being normally open for occupancy, latch means for locking said chairs in folded position, and latch releasing means associated with each chair and operable upon a predetermined weight bearing upon an unfolded chair for releasing the latch means of a next adjacent chair to enable the unfolding of said next adjacent chair for occupancy.

6. In a theater or like auditorium having an entrance aisle and an exit aisle, a row of foldable chairs arranged between said entrance aisle and said exit aisle, the chair next to said exit aisle being normally open for occupancy, latch means for locking said chairs in folded position, and latch releasing means associated with each chair and operable upon a predetermined weight bearing upon an unfolded seat for releasing the latch means of a next adjacent chair to enable the unfolding of said next adjacent chair for occupancy, and automatic means for transferring the chair next to the exit aisle to the opposite end of said row upon the manual folding of the same after an occupant has left the chair.

7. In combination, a row of chairs to be occupied, means for lowering the chair at one end of said row below the level of the other chairs, means for sliding the lowered end chair toward the opposite end of said row and beneath the remaining chairs of the row, means for sliding the remaining chairs of the row toward that end left vacant by the lowered chair, and means for raising the lowered chair to the level of the row of chairs after it reaches the limit of its sliding movement.

8. In combination, upper and lower sets of parallel rails, a row of chairs slidably mounted upon said upper set of rails, elevator means at opposite ends of said row of chairs for switching the end chair at one end of said row from the upper set of rails to the lower set at one end and from the lower set of rails to the upper set of rails at the opposite end, and driven conveyor means between said elevator means for conveying a chair from one elevator means to the other.

9. In combination, upper and lower sets of parallel rails, a row of chairs slidably mounted upon said upper set of rails, elevator means at opposite ends of said row of chairs for switching the end chair at one end of said row from the upper set of rails to the lower set at one end and from the lower set of rails to the upper set of rails at the opposite end, and driven conveyor means between said elevator means for conveying a chair from one elevator means to the other, and automatic means for sliding said row of chairs upon the upper set of rails during the operation of said conveyor means.

10. In combination, upper and lower sets of rails, a row of chairs slidably mounted upon said upper rails for movement longitudinally thereon in one direction, means for lowering the chair at that end of the row toward which the row of chairs are slidable to the level of said lower rails, means for sliding the lowered chair over the lower set of rails in a direction opposite to the sliding movement of the row of chairs, and means for receiving the lowered chair at the opposite end of the row and for raising the same to the level of the chairs in said row.

11. In combination, upper and lower sets of rails, a row of chairs slidably mounted upon said upper rails for movement longitudinally thereon in one direction, means for lowering the chair at that end of the row toward which the row of chairs are slidable to the level of said lower rails, means for sliding the lowered chair over the lower set of rails in a direction opposite to the sliding movement of the row of chairs, and means for receiving the lowered chair at the opposite end of the row and for raising the same to the level of the chairs in said row, and means for sliding said row of chairs after the said end chair has been lowered to fill the space occupied by the lowered chair with the next adjacent chair of the row and for providing a space at the opposite end of the row to receive the lowered chair when raised to a position on the level therewith.

12. In combination, a row of sliding foldable chairs one of which is normally in an open position, driven mechanism for sliding said row of chairs longitudinally in one direction, and means in the path of movement of the open chair at one end of said row for rendering said driven mechanism inoperative.

13. In combination, a row of sliding foldable chairs one of which is normally in an open position, driven mechanism for sliding said row of chairs longitudinally in one direction, and means in the path of movement of the open chair at one end of said row for rendering said driven mechanism inoperative, and means operable upon the manual folding of the open end chair for transferring said chair to the opposite end of the row and for effecting operation of said driven mechanism.

14. In combination, sets of upper and lower, parallel rails, a row of foldable chairs slidably mounted on said upper set of rails, the chair of one end of the row being open, an elevator device at each end of the row for lowering the open chair at one end thereof and for raising a chair at the opposite end of the row, each elevator device including sets of rails for alternate alignment with said upper and lower sets of rails for transferring a chair from one level to another, means operable upon manual folding of the end open chair to cause the lowering and raising of the elevator device at that end of the row, means for moving a lowered folded chair from the rails of the lowered elevator device onto the lower set of rails and subsequently onto the rails of the other elevator device, means for shifting said row of chairs in the direction toward the end formerly occupied by the lowered chair, and means for raising the last mentioned elevator device to cause the rails thereof to register with the upper set of rails.

15. In combination, a row of collapsible slidable chairs folded normally in a closed position, continuously driven operating means for individually transposing the chair at one end of the row to the opposite end thereof, means for intermittently sliding said row of seats, and means in the path of sliding movement of a chair when in an open position for rendering said driven operating means inoperative.

16. In a theater seating system of the class described, a source of power, a row of individual folding chairs, a seat return enclosure beneath said row of chairs, means driven by said source of power for transposing a folded chair at one end of a row to the opposite end thereof through said return enclosure, and for moving the remaining chairs toward that end of the row at which the transposed chair was located, and means operable by the movement of the next adjacent unfolded chair for rendering said transposing means inoperative.

17. A folding chair comprising Z-shape frame structure having a foot rest at the bottom thereof and a riser, a seat section slidably mounted upon the top of said frame structure, a back section pivotally supported by said frame structure for movement to open upstanding position or to a closed position over the top of said frame structure, and means operable upon the swinging movement of said back section to a closed position for sliding said seat to a vertical position substantially parallel with said riser, and for returning said seat to a substantially horizontal position upon the top of said frame structure upon the swinging movement of said back section to open position.

18. A folding chair comprising a frame structure, a seat slidably mounted upon said frame structure for movement to a horizontal operative position or to a lowered vertical inoperative position, a back section pivotally supported by said frame structure embodying a pair of slidable overlapping sections, said back adapted to swing to an open upright position or to a substantial horizontal position over the top of said frame structure, and means operable upon the movement of said back section to a horizontal position for sliding said seat from a horizontal position to a vertical position and for causing the sections of said back to slide one over the other and for reversing the action of the parts upon swinging movement of said back from a closed to open position.

19. In combination, a row of chairs arranged side by side, means for moving said row of chairs longitudinally, and means by which a chair at one end of said row will be lowered out of the row and will be transferred to the opposite end of the row and raised back into the row to become the first end chair at the opposite end thereof prior to any other chair of the row and subsequent to its movement from its first end position.  THOMAS P. MUSGRAVE.